No. 651,948.  
R. P. LAWSON.  
FILTER.  
(Application filed Apr. 16, 1900.)
Patented June 19, 1900.
(No Model.)
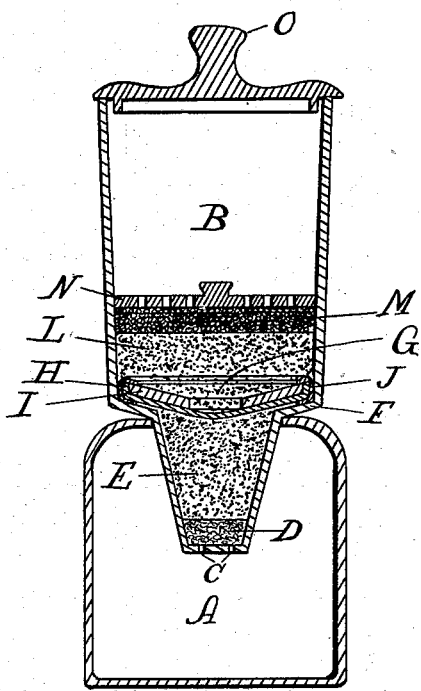
Witnesses  
M. McGinnis  
C. F. Crutchfield
Inventor  
Robert P. Lawson  
By Hazard & Harpham  
Attorneys

UNITED STATES PATENT OFFICE.

ROBERT P. LAWSON, OF LOS ANGELES, CALIFORNIA.

FILTER.

SPECIFICATION forming part of Letters Patent No. 651,948, dated June 19, 1900.

Application filed April 16, 1900. Serial No. 13,131. (No model.)

*To all whom it may concern:*

Be it known that I, ROBERT P. LAWSON, a citizen of the United States, residing at Los Angeles, in the county of Los Angeles, State of California, have invented new and useful Improvements in Filters, of which the following is a specification.

My invention relates to devices for removing impurities from liquids, particularly water for household uses; and the object thereof is to provide a filter of simple construction that will remove bacteria and disease-breeding matter from the water used in the household for domestic purposes, and which can be cleaned easily, and which will readily remove impurities from any other liquids. I accomplish this object by the device hereinafter described, and illustrated in the accompanying drawing, forming a part hereof, which is a vertical sectional view of my improved filter.

In the drawing, A is the reservoir in which the filtered water is collected and is preferably an earthen vessel provided with a faucet (not shown) for drawing water therefrom when desired. On the top of reservoir A and preferably projecting into the same is a filtering-chamber B, preferably constructed of earthenware, in the bottom of which are perforations C, through which the water passes into reservoir A after having passed through the filtering material in the chamber B. This filtering material is composed of asbestos, charcoal, and sand arranged as follows: In the bottom of chamber B is a layer of flake or picked asbestos D. Above this layer of asbestos is a much thicker layer of fine charcoal E, preferably animal charcoal, which extends up to an offset or shoulder F in chamber B. On shoulder F is a removable partition G, composed of a sheet of asbestos H and an earthenware or other mineral washer I, which are held together preferably by an elastic-rubber band J, which is sprung over the edges thereof. Any yielding material may be used instead of the band J which will form a water-tight joint between the partition and the walls of the filtering-chamber. Partition G fits so closely the walls of chamber B that a water-tight joint is formed between them, and all the water from above must pass through the opening in the center of washer I and through the sheet of asbestos H and is thereby caused to fall upon the center of charcoal E, through which and asbestos D it percolates before it passes through perforations C into reservoir A, and all impurities, if any, which have passed through the sheet-asbestos are caught and retained thereby. Upon partition G is another layer of charcoal L. Above charcoal L is a layer of sharp clean sand, upon which is the removable foraminous disk N, preferably of earthenware, having a close fit with the walls of chamber B to protect the filtering material from being disturbed when the water is put into the chamber and to cause the water to pass through the perforations in disk N. The space in chamber B above disk N forms the receptacle for holding the unfiltered water. Chamber B is provided with a cover O to keep dust, &c., from getting into water being filtered.

It will be observed that by the above-described construction the water first passes through a layer of sand, which will arrest the coarser impurities, and then through a layer of charcoal, which extracts more of the impurities. It then passes through the sheet-asbestos, where the remaining impurities—such as bacteria, &c.—are almost all extracted. The very few impurities which succeed in passing through the sheet-asbestos are arrested and retained by the layer of charcoal and flake-asbestos in the bottom of the filtering-chamber, and pure water escapes into reservoir A. When the sand and the charcoal immediately thereunder becomes charged with so much impure matter that their filtering capacity is impaired, they are removed and cleaned, or fresh material is used. Partition G is also removed and cleaned, which can be easily done with boiling water, or by removing the rubber band the remainder may be purified by putting it into a clear flame. The filtering material below partition G may be easily replaced with new when desired.

In preparing and in repacking my filter I prefer to thoroughly saturate each layer with pure water before putting in the next one above in order that there shall be a compact mass of filtering material.

Having described my invention, what I claim is—

1. A filter comprising a reservoir for holding the filtered water; a filtering-chamber upon said reservoir having perforations in the bottom thereof adapted to discharge the filtered water into said reservoir; filtering material in the lower portion of said filtering-chamber composed of a layer of flake-asbestos, a layer of charcoal superimposed thereon, a removable partition having water-tight contact with the wall of the filter-chamber above said charcoal; said partition comprising a sheet of asbestos, a mineral washer thereon and the two bound together by an elastic band of rubber, a layer of charcoal superimposed upon the partition, and a layer of sand upon said last layer of charcoal.

2. In a water-filter, a removable partition extending completely across the filtering-chamber near the center of the filtering material, comprising a sheet of asbestos and a washer held together by a yielding substance adapted to make a water-tight joint between the partition and the walls of the chamber.

3. In a filter, the combination of the filtering-chamber B, having perforations C in the bottom thereof; filtering material in the lower portion of said chamber, comprising flake-asbestos D, charcoal E, sheet-asbestos H attached to washer I, charcoal L and sand M, arranged as described with reservoir A.

In witness that I claim the foregoing I have hereunto subscribed my name, this 10th day of April, 1900, at Los Angeles, California.

R. P. LAWSON.

Witnesses:
G. E. HARPHAM,
J. S. CRAWFORD.